(12) United States Patent
Ou et al.

(10) Patent No.: US 9,815,709 B2
(45) Date of Patent: Nov. 14, 2017

(54) METHOD FOR PREPARING NICKEL-COBALT-MANGANESE HYDROXIDE

(71) Applicants: GUANGDONG BRUNP RECYCLING TECHNOLOGY CO., LTD, Guangdong (CN); HUNAN BRUNP RECYCLING TECHNOLOGY CO., LTD, Hunan (CN)

(72) Inventors: Yannan Ou, Guangdong (CN); Changdong Li, Guangdong (CN); Haijun Yu, Guangdong (CN)

(73) Assignees: Guangdong Brunp Recycling Technology Co., Ltd, Guangdung (CN); Hunan Brunp Recycling Technology Co. Ltd., Hunan (CN)

( * ) Notice: Subject to any disclaimer, the term of this patent is extended or adjusted under 35 U.S.C. 154(b) by 19 days.

(21) Appl. No.: 14/775,397

(22) PCT Filed: Apr. 28, 2013

(86) PCT No.: PCT/CN2013/074976
§ 371 (c)(1),
(2) Date: Sep. 11, 2015

(87) PCT Pub. No.: WO2014/139200
PCT Pub. Date: Sep. 18, 2014

(65) Prior Publication Data
US 2016/0016815 A1 Jan. 21, 2016

(30) Foreign Application Priority Data
Mar. 11, 2013 (CN) .......................... 2013 1 0076317

(51) Int. Cl.
| | |
|---|---|
| *C01G 53/00* | (2006.01) |
| *H01M 4/04* | (2006.01) |
| *H01M 4/485* | (2010.01) |
| *H01M 4/505* | (2010.01) |
| *H01M 4/525* | (2010.01) |
| *H01M 10/052* | (2010.01) |

(52) U.S. Cl.
CPC ........ *C01G 53/006* (2013.01); *H01M 4/0471* (2013.01); *H01M 4/485* (2013.01); *C01P 2004/03* (2013.01); *C01P 2004/32* (2013.01); *C01P 2004/61* (2013.01); *H01M 4/505* (2013.01); *H01M 4/525* (2013.01); *H01M 10/052* (2013.01)

(58) Field of Classification Search
CPC .... C01G 53/006; H01M 4/485; H01M 4/505; H01M 4/525; H01M 4/0471
USPC .................................................. 423/594.3, 50
See application file for complete search history.

(56) References Cited

U.S. PATENT DOCUMENTS

| | | | |
|---|---|---|---|
| 5,807,532 A | 9/1998 | Takahashi et al. | |
| 6,849,208 B1 * | 2/2005 | Stoller ................ | C01G 53/006 252/500 |

FOREIGN PATENT DOCUMENTS

| | | |
|---|---|---|
| CN | 101202343 A | 6/2008 |
| CN | 102751485 A | 10/2012 |
| EP | 2312677 A2 | 4/2011 |
| FR | 2932396 * | 12/2009 |

* cited by examiner

*Primary Examiner* — Steven Bos
(74) *Attorney, Agent, or Firm* — Hahn Loeser & Parks, LLP—San Diego

(57) ABSTRACT

A method for preparing nickel-cobalt-manganese hydroxide. The method comprises the following steps: (1) dissolving microcrystalline cellulose into water to obtain a suspension; and adding a nickel source, a cobalt source, and a manganese source into the suspension to obtain a solution containing nickel, cobalt, and manganese; (2) adding hexamethylenetetramine into the solution containing nickel, cobalt, and manganese, heating the reaction solution to 80-90° C., and reacting for 5-10 min, then heating with a microwave hydrothermal synthesis instrument at a frequency of 2450 MHz for 10-60 min; and (3) filtering the reaction solution obtained in step (2), and taking the filter residue, washing the filter residue with pure water and ethanol respectively, then drying, crushing, and screening the filter residue to obtain nickel-cobalt-manganese hydroxide. Nickel-cobalt-manganese hydroxide prepared from the abovementioned method has a uniform particle size and consistent morphology and structure; thus solving the problems of the uncontrollable appearance and structure and the inconsistent performances of the product caused by the vigorous reaction in the existing method for preparing nickel-cobalt-manganese hydroxide.

4 Claims, 1 Drawing Sheet

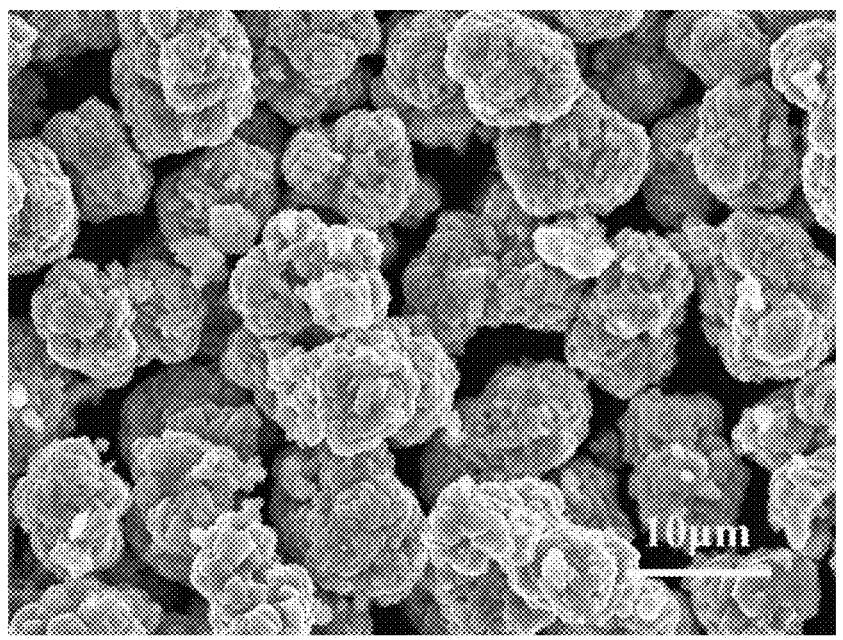

METHOD FOR PREPARING NICKEL-COBALT-MANGANESE HYDROXIDE

CROSS-REFERENCE TO RELATED APPLICATIONS

The present application is a U.S. National Stage entry under 35 U.S.C. §371 of International Application No. PCT/CN2013/074976 filed on Apr. 28, 2013, designating the United States of America and published in Chinese on Sep. 18, 2014, which in turn claims priority to Chinese Patent Application No. 201310076317.9 filed on Mar. 11, 2013, each of which is hereby incorporated by reference in its entirety.

TECHNICAL FIELD

The present invention relates to a method for preparing nickel-cobalt-manganese hydroxide.

BACKGROUND

With the continuous development of the digital product industry, there is an increasing need for the battery. Lithium nickel-cobalt-manganese oxide is an important cathode material for a lithium battery, with an increasingly wide production and use, and a large market demand. Nickel-cobalt-manganese hydroxide, i.e., a nickel-cobalt-manganese ternary precursor, can be synthesized into lithium nickel-cobalt-manganese oxide by adding a lithium source, therefore, nickel-cobalt-manganese hydroxide is a necessary material for producing lithium nickel-cobalt-manganese oxide. The size, morphology and structure of nickel-cobalt-manganese hydroxide have direct effects on the size, morphology and structure of the subsequent processing lithium nickel-cobalt-manganese oxide. Therefore, the performances of the nickel-cobalt-manganese ternary precursor decide the performances of lithium nickel-cobalt-manganese oxide.

Currently, the common method for preparing nickel-cobalt-manganese hydroxide is the direct precipitation method, wherein a strongly basic precipitant is added into the solution of nickel, cobalt, and manganese, thus synthesizing nickel-cobalt-manganese hydroxide, i.e., a nickel-cobalt-manganese ternary precursor. Such method is widely used, but due to the vigorous reaction, the appearance and structure of the nickel-cobalt-manganese ternary precursor is uncontrollable, and the performances of the products are inconsistent, thus affecting the performances of the subsequent processing battery material.

SUMMARY OF THE INVENTION

In order to solve the problems of the uncontrollable appearance and structure and the inconsistent performances of the product caused by the vigorous reaction in the existing method for preparing nickel-cobalt-manganese hydroxide, the object of the present invention is to provide a method for preparing nickel-cobalt-manganese hydroxide, so as to obtain a precursor of the excellent lithium nickel-cobalt-manganese oxide ternary cell material.

The object of the present invention can be achieved by the following technical solutions:

a method for preparing nickel-cobalt-manganese hydroxide, comprising the following steps:

(1) dissolving microcrystalline cellulose (as a template excipient) into water, and stirring to homogeneity to obtain a suspension; and adding a nickel source, a cobalt source, and a manganese source into the suspension, wherein the mass ratio among the nickel source, the cobalt source, and the manganese source is (1-3):1:(1-1.5), the ratio between the total mass of the nickel source, the cobalt source, and the manganese source and the mass of the microcrystalline cellulose is (1-3):1, stirring to homogeneity to obtain a solution containing nickel, cobalt, and manganese;

(2) adding hexamethylenetetramine (a weak basic nucleating agent) into the solution containing nickel, cobalt, and manganese, making the ratio between the total mass of the nickel source, the cobalt source, and the manganese source and the mass of the hexamethylenetetramine being 1:(1-5), and stirring to homogeneity to obtain a reaction solution; heating the reaction solution to 80-90° C., and reacting for 5-10 min, then heating with a microwave hydrothermal synthesis instrument at a frequency of 2450 MHz for 10-60 min;

(3) filtering the reation solution obtained in step (2), and taking the filter residue, washing the filter residue with pure water and ethanol respectively, then drying, crushing, and screening the filter residue, thus obtaining nickel-cobalt-manganese hydroxide;

the nickel source is one of nickel acetate, nickel chloride or nickel sulfate;

the cobalt source is one of cobalt acetate, cobalt chloride or cobalt sulfate;

the manganese source is one of manganese acetate, manganese chloride or manganese sulfate.

As compared to the prior art, the present invention has the advantages and effects as follows:

1. As microcrystalline cellulose is used as a template in the present invention, the nickel, cobalt, and manganese ions are interacted with the hydroxyls on the surface of microcrystalline cellulose, and can be nucleated and grown homogeneously along the distribution of the hydroxyls of microcrystalline cellulose, so that the prepared nickel-cobalt-manganese hydroxide has a uniform particle size, and consistent morphology and structure.

2. Hexamethylenetetramine is used in the present invention to promote the nucleation of nickel-cobalt-manganese hydroxide. Hexamethylenetetramine is reacted with water, and OH— is gradually formed, thus controlling the nickel, cobalt, and manganese ions to be nucleated stably on the surface of microcrystalline cellulose. On the contrary, in the conventional direct addition of strongly basic precipitating agent, the strongly basic precipitating agent makes the nickel, cobalt, and manganese ions to be nucleated and grown rapidly in a short time, and it is hard to control the nickel, cobalt, and manganese ions to be nucleated stably on the surface of microcrystalline cellulose, which renders the product has a big size, and inconsistent morphology and structure.

3. As a microwave heating method is used in the present invention, the nucleation and growth of nickel-cobalt-manganese hydroxide on the surface of the microcrystalline cellulose is accelerated, and the reaction rate is increased, so that the problem of the long time-consuming of the natural growth of nickel-cobalt-manganese hydroxide on the surface of the microcrystalline cellulose is solved

BRIEF DESCRIPTION OF THE DRAWINGS

FIG. 1 shows a scanning electron micrograph of nickel-cobalt-manganese hydroxide prepared in example 1.

DETAILED DESCRIPTION

The present invention is further illustrated in detail below in combination with the examples and the drawings, but the embodiments of the present invention are not limited thereto.

EXAMPLE 1

A method for preparing nickel-cobalt-manganese hydroxide, comprising the following steps:

(1) dissolving 2 g of microcrystalline cellulose into 80 mL of water, and stirring to homogeneity to obtain a suspension; adding 1 g of nickel acetate, 1 g of cobalt acetate, and 1 g of manganese acetate into the suspension, and stirring to homogeneity to obtain a solution containing nickel, cobalt, and manganese;

(2) adding 3 g of hexamethylenetetramine into the solution containing nickel, cobalt, and manganese, and stirring to homogeneity to obtain a reaction solution; heating the reaction solution to 80° C. and reacting for 5 min, then heating with a microwave hydrothermal synthesis instrument (Type No.: XH-800S-10 from Beijing XiangHu Science and Technology Development Co., Ltd, hereinafter) at a frequency of 2450 MHz for 30 min.

(3) filtering the reaction solution obtained in step (2), and taking the filter residue, washing the filter residue with pure water and ethanol respectively, then drying the filter residue at 60° C., crushing, and screening, thus obtaining nickel-cobalt-manganese hydroxide.

As shown in FIG. 1, the obtained nickel-cobalt-manganese hydroxide had a uniform particle size of about 10 μm, consistent spherical morphology, and consistent structure.

EXAMPLE 2

A method for preparing nickel-cobalt-manganese hydroxide, comprising the following steps:

(1) dissolving 4 g of microcrystalline cellulose into 100 mL of water, and stirring to homogeneity to obtain a suspension; adding 2 g of nickel chloride, 2 g of cobalt chloride, and 2 g of manganese chloride into the suspension, and stirring to homogeneity to obtain a solution containing nickel, cobalt, and manganese;

(2) adding 6 g of hexamethylenetetramine into the solution containing nickel, cobalt, and manganese, and stirring to homogeneity to obtain a reaction solution; heating the reaction solution to 90° C. and reacting for 10 min, then heating with a microwave hydrothermal synthesis instrument at a frequency of 2450 MHz for 60 min.

(3) filtering the reaction solution obtained in step (2), and taking the filter residue, washing the filter residue with pure water and ethanol respectively, then drying the filter residue at 60° C., crushing, and screening, thus obtaining nickel-cobalt-manganese hydroxide.

Nickel-cobalt-manganese hydroxide prepared in this example had a similar particle size and morphology as those in example 1, with a uniform particle size of about 10 μm, consistent spherical morphology, and consistent structure.

The abovementioned examples are the preferred embodiments of the present invention, but the embodiments of the present invention are not limited thereto. Any other changes, modifications, alternatives, combinations, and simplifications, all of which shall be the equivalent replacements, without departing from the spirit principle of the present invention, should be included in the scope of protection of the present invention.

The invention claimed is:

1. A method for preparing nickel-cobalt-manganese hydroxide, comprising the following steps:
    (1) dissolving microcrystalline cellulose into water, and stirring to homogeneity to obtain a suspension; adding a nickel source, a cobalt source, and a manganese source into the suspension, wherein the mass ratio among the nickel source, the cobalt source, and the manganese source is (1-3):1:(1-1.5), and the ratio between the total mass of the nickel source, the cobalt source, and the manganese source and the mass of the microcrystalline cellulose is (1-3):1, and stirring to homogeneity to obtain a solution containing nickel, cobalt, and manganese;
    (2) adding hexamethylenetetramine into the solution containing nickel, cobalt, and manganese, making the ratio between the total mass of the nickel source, the cobalt source, and the manganese source and the mass of the hexamethylenetetramine being 1:(1-5), and stirring to homogeneity to obtain a reaction solution; heating the reaction solution to 80-90° C., and then reacting the reaction solution that has been heated to 80-90 ° C. for 5-10 min, and then heating the reaction solution that has been reacted for 5-10 min with a microwave hydrothermal synthesis instrument at a frequency of 2450 MHz for 10-60 min;
    (3) filtering the reaction solution obtained in step (2) after the heating the reaction solution with the microwave hydrothermal synthesis instrument, and taking filter residue, washing the filter residue with pure water and ethanol respectively, then drying, crushing, and screening the filter residue, thus obtaining nickel-cobalt-manganese hydroxide.

2. The method for preparing nickel-cobalt-manganese hydroxide according to claim 1, characterized in that the nickel source is one of nickel acetate, nickel chloride or nickel sulfate.

3. The method for preparing nickel-cobalt-manganese hydroxide according to claim 1, characterized in that the cobalt source is one of cobalt acetate, cobalt chloride or cobalt sulfate.

4. The method for preparing nickel-cobalt-manganese hydroxide according to claim 1, characterized in that the manganese source is one of manganese acetate, manganese chloride or manganese sulfate.

* * * * *